United States Patent Office 2,936,271
Patented May 10, 1960

2,936,271
IRRADIATION OF POLYMERIC MATERIALS

John Rehner, Jr., Westfield, and William John Gilbert McCullough, Plainfield, N.J., assignors to Esso Research and Engineering Company, a corporation of Delaware No Drawing. Application December 7, 1955
Serial No. 551,514

12 Claims. (Cl. 204—154)

This invention relates to the irradiation of polymeric materials and more particularly relates to a method for reducing the molecular weight of certain polymeric materials by subjecting them to gamma radiation.

It has recently been found that polymeric materials, such as polyethylene, can be effectively prepared by polymerizing monomers in the presence of a catalyst obtained by mixing a reducing metal compound (e.g., aluminum triethyl and/or diethyl aluminum chloride) with a reducible metal compound (e.g., titanium tetrachloride). This new process has been found to have a number of advantages over conventional polymerization processes. More specifically, polymerizations by this new method may be carried out generally at substantially lower pressures than the conventional processes. However, this new polymerization process is quite sensitive to the catalyst employed. More specifically, it has been found to be quite difficult to make specification molecular weight products. In certain instances, it has also been difficult to obtain relatively low molecular weight products. The production of specification molecular weight products is of course very important for subsequent uses, since the successful operation of molding and extruding apparatus is dependent to a great extent upon this. Thus there has been a need for a simple and effective means for obtaining desired molecular weight products in this new polymerization process.

A novel method has now been found for reducing the molecular weight of polymeric products produced by polymerizing or copolymerizing monomers in the presence of a catalyst obtained by mixing a reducing metal compound with a reducible metal compound. The present method comprises subjecting these polymeric materials, such as polyethylene, to the action of gamma rays in an oxygen-containing atmosphere to thereby obtain a reduction in molecular weight. This result is entirely unexpected in view of the fact that certain polymeric materials produced by conventional polymerization processes, such as other types of polyethylenes, have been found to become insoluble, or cross-link, in the presence of high intensity ionizing radiation such as gamma rays.

The present invention, it will be seen, thus makes possible the production of specification molecular weight products in the instant polymerization process. More specifically, the polymerization process can be carried out so as to assure the production of polymeric materials having molecular weights greater than specification, after which the polymeric materials may be subjected to gamma rays to reduce their molecular weights to the desired point. The present method for reducing molecular weight has a number of advantages over conventional molecular weight degradation processes carried out by mechanical and/or chemical means. More particularly, these advantages include (1) reduced cost in that expensive milling apparatus, high temperatures, etc. are not required, (2) better process control due to controlled radiation dosages, (3) no product contamination as compared to chemical degradation process, and (4) ready adaptability to continuous processes. The polymeric products of this invention are useful as lubricant additives, film-forming materials, molded and extruded plastics and the like.

The catalyst employed in the polymerization reaction to prepare the polymeric materials of this invention is formed by mixing a material, generally a metal compound, having reducing properties with a reducible metal compound. More particularly, the metal compound having reducing properties is generally an aluminum hydride or organo-aluminum compound such as aluminum dialkyls or diaryls or aluminum trialkyls or triaryls. Specific examples of such aluminum compounds include aluminum triethyl, aluminum trimethyl, aluminum triisopropyl, aluminum diethyl bromide, aluminum diethyl chloride, aluminum diphenyl bromide, aluminum diphenyl chloride, aluminum triphenyl, aluminum hydride, ethyl aluminum dihydride, diethyl aluminum hydride and ethoxy aluminum diethyl. In general, the aluminum compounds have the general formula

where R and R' are members selected from the group consisting of hydrogen, alkyl radicals and aryl radicals and X is a member selected from the group consisting of hydrogen, alkyl radicals, aryl radicals, halogen atoms, alkoxy radicals, aryloxy radicals, secondary amino radicals, secondary acid amide radicals, mercapto radicals, thiophenol radicals, radicals of carboxylic acids and radicals of sulfonic acids. The most commonly used aluminum compounds are (1) dialkyl aluminum monohalides containing about 2 to 4 carbon atoms in the alkyl groups and chlorine or bromine atoms, particularly chlorine atoms, and (2) aluminum trialkyls containing about 2 to 4 carbon atoms in the alkyl groups. Mixtures of these two types of aluminum compounds are frequently employed.

The reducible metal compound is one of a metal of groups IV–B, V–B, VI–B and VIII of the periodic system of elements. Examples of such elements include titanium, zirconium, hafnium, thorium, uranium, vanadium, columbium, tantalum, chromium, molybdenum and tungsten. Examples of the compounds of these metals which may be used include halides such as chlorides or bromides, oxy halides such as oxychlorides, complex halides such as complex fluorides, freshly precipitated oxides or hydroxides, organic compounds such as alcoholates, acetates, benzoates or acetyl acetonates. The most commonly used salts are those of titanium, zirconium, thorium, uranium and chromium. Titanium salts are most frequently employed such as titanium tetrachloride, titanium oxychloride or titanium acetyl acetonate.

The catalyst mixture is prepared simply by mixing the metal compound having reducing properties with the reducible heavy metal compound in the presence of an inert liquid diluent. In general, at least about 0.1 mole of the metal compound having reducing properties will be mixed with a mole of the reducible metal compound. Usually the molar ratio of the reducing metal compound to the reducible metal compound is in the range of about 0.2:1 to 8:1, more preferably about 0.5:1 to 4:1. The catalyst mixture is prepared generally using an inert liquid diluent in an amount sufficient to form a mixture containing about 0.2 to 25.0 weight percent of the catalyst components, and employing mixing temperatures in the range of about −20 to 150° F. and mixing times of about 5 minutes to 24 hours. The optimum conditions for preparing the catalyst depend in large measure on the particular aluminum alkyl used as the reducing agent. For example, aluminum triethyl is generally employed using relatively low concentrations and temperatures to form an active catalyst. On the other hand, when using aluminum diethyl chloride at approximately .5 weight percent concentration, heating times of about 15 to 30 minutes at temperatures of about 120 to 140° F. give the most active catalyst. When the two catalyst components are mixed in the presence of an inert liquid diluent, a precipitate is generally formed which is insoluble in the inert liquid diluent.

A wide variety of polymeric products can be prepared by employing the above-described catalyst mixture of a reducing metal compound with a reducible metal compound as a catalyst. The process is particularly applicable to the polymerization of ethylene but is also applicable to preparing other homopolymers or copolymers, particularly those of hydrocarbon monomers. For example, polypropylene, and copolymers of ethylene and propylene can be prepared by this polymerization method, as well as copolymers of ethylene or propylene with other hydrocarbon monomers.

Generally an inert liquid diluent will be employed in the polymerization process to facilitate the polymerization reaction. The amount of the inert liquid diluent employed in the polymerization process will generally be such that the final polymeric product in the reaction mixture does not exceed about 40 weight percent so that a relatively fluid reaction mixture is produced. Usually the amount of inert diluent is such that the polymeric product in the final reaction mixture is in the range of about 1% to 25% by weight. The proportion of catalyst based on the inert liquid diluent will generally be in the range of about 0.05 to 0.5 weight percent, preferably about 0.1 to 0.2 weight percent.

The polymerization reaction conditions, that is, time, temperature and pressure, are adjusted to produce polymers or copolymers having molecular weights of at least about 2,000, usually at least about 30,000 (e.g., in the range of about 50,000 to 500,000). Polymeric products having molecular weights up to 2,000,000 to 5,000,000 or higher may be prepared. The molecular weights referred to herein are number average, and assume the relation of intrinsic viscosity to molecular weight to be that given by Harris, Journal of Polymer Science, 8, 361 (1952). Generally, temperatures in the range of about $-40$ to 200° C., usually about 20° to 80° C. (e.g., 50° to 60° C.), may be employed. Higher temperatures may be employed if desired, but temperatures above about 250° C. are undesirable generally since the catalyst decomposes to a considerable extent at this temperature. In general, pressures in the range of about 1 to 250 atmospheres or higher may be employed. If desired, subatmospheric pressures may be employed with certain monomers. The process is particularly effective for polymerizing ethylene and this polymerization may be carried out conveniently by employing pressures of about 1 to 10 atmospheres. An advantage of the process is that relatively low pressures may be employed. In order to obtain polymeric products having molecular weights above about 2,000, a polymerization reaction time of at least about 15 minutes will be required. Generally, polymerization reaction times in the range of about 15 minutes to 24 hours, usually about 2 to 6 hours, will be employed.

Upon completion of the polymerization reaction, the polymeric product is generally separated from the reaction mixture by filtration, extraction and/or distillation, the polymeric product washed with materials such as alcohols and then dried by heating. Generally the ash contents of the polymeric products will be in the range of about 0.01 to 1.0 weight percent based on the polymeric product. The ash contents referred to herein are those determined by ASTM Procedure D482-46. It will be understood that if desired, the irradiated polymeric product of this invention may also be washed with materials such as alcohols, e.g., butyl alcohol, to remove metal contaminants therefrom. Polyethylenes prepared as described above have unique structures and properties. The polyethylene molecules are almost completely linear and have practically no branched chains, at most about 3 branched methyl groups, and usually less than 1 methyl group for every hundred carbon atoms in the linear chain. In addition, the polyethylene molecules have only a small amount of unsaturation, generally less than about 0.5 double bond per hundred carbon atoms. The present invention is particularly effective for reducing the molecular weight of polyethylenes and polypropylenes. By the method of the present invention, reduction in molecular weights to 10,000 or less is readily accomplished. Preferably the polymeric products which are irradiated in accordance with the present invention are in a subdivided form such as a powder or granules.

The polymeric products described above are irradiated with gamma rays in accordance with the present invention. These gamma rays may be derived from the radioactive decay of certain elements or radioisotopes, such as radium 226, radium A, radium B, radium C, radium D, thallium 210, cobalt 60, cesium 137, europium 152-154, cesium 134, cerium 144, silver 110, thulium 170, tantalum 182, scandium 46, terbium 160, or iridium 192, or from chemical compounds of, or materials containing, such elements or isotopes. The gamma rays may also be derived from suitably moderated radiation produced in nuclear reactors, or "atomic piles," or from the spent fuel elements obtained from the operation of such reactors. The amount of radiation which will be employed will depend upon the degree of molecular weight reduction desired and more particularly upon the original molecular weight of the polymeric product and the desired final molecular weight of the irradiated polymeric product. In general, however, radiation dosages amounting to about 100 roentgens to 100 megaroentgens, usually about 1 to 50 megaroentgens, will be employed. The irradiation time will, of course, depend upon the radiation dosage rate as well as the degree of molecular weight reduction desired. Irradiation times of from a few seconds to several days, or usually about 0.5 to 100 hours, may be employed. Radiation dosage rates in the range of about 0.1 to 50 megaroentgens per hour or higher are employed in accordance with the present invention. Preferably the dosage rate is at least 0.3 megaroentgen per hour. The irradiation may be carried out at moderately reduced pressure, atmospheric pressure or elevated pressure (e.g., 0.5 to 100 atmospheres). Irradiation temperatures in the range of about 0° to 250° F. are employed in accordance with the present invention. The irradiation of course should be carried out at temperatures below the thermal decomposition point of the polymeric products involved. Usually it will be convenient to carry out the irradiation at about room temperature (e.g., 50° to 100° F.) and about atmospheric pressure (e.g., 1 to 5 atm.). The gamma irradiation in accordance with the present invention is carried out in an oxygen-containing atmosphere. Generally this may be conveniently accomplished by irradiating the polymeric materials in the presence of air.

The invention will be more fully understood by reference to the following examples. It is pointed out, however, that the examples are given for the purpose of illustration only and are not to be construed as limiting the scope of the present invention in any way.

*Example I.—Gamma irradiation of polyethylene*

The polyethylene (polyethylene A) employed in this example had a molecular weight of about 54,000 and was prepared in the following manner: The polymerization catalyst was prepared by heating with stirring for 15 minutes at 50° C. 0.53 g. of AlEt$_2$Cl and 0.8 g. of TiCl$_4$ (Al:Ti=1:1) in 200 ml. of heptane. After this pretreatment, an additional 450 ml. of heptane was added. Ethylene (Matheson C.P.) was added, after passage through scrubbers of glass wool, activated charcoal and Dry Ice, at a rate of 1 liter/min. (atmospheric pressure). The temperature initially was 25° C. and rose rapidly to 60° C. where the bulk of the run was carried out. Heat was applied during the latter stages of the run to increase the temperature to 70° C. Stirring was maintained throughout the run which lasted for 4½ hours at which time it was quenched with 300 ml. of isopropyl alcohol and 100 ml. of n-heptane. The crude product was filtered, washed twice with isopropyl alcohol and finally with acetone. It was then dried in a vacuum oven for 3 days giving a final yield of 153 g. of polyethylene (polyethylene A). Polyethylene A, upon ashing, yielded an ash content of about 0.1 weight percent.

For comparison purposes, a conventional polyethylene (produced by the Bakelite Division of Carbide and Carbon Chemicals Corp., and known commercially as Bakelite Polyethylene DYNH-3; hereinafter referred to as polyethylene B) having a molecular weight of about 21,000 was also irradiated with gamma rays. Samples of each of the two polyethylenes (powder form) were put into separate 1-ounce white glass bottles and covered with Bakelite caps. The two sample bottles were then each exposed to gamma rays (emitted from a cobalt[60] source) continuously for 89.8 hours at room temperature. The gamma ray intensity in these experiments was about 320,000 roentgens per hour so that the total gamma ray dose was about 28,736,000 roentgens. The two sample bottles were then opened and the irradiated products were evaluated for molecular weights.

It was found that the conventional polyethylene (polyethylene B) had become cross-linked and was insoluble in hot tetralin. The polyethylene of this invention (polyethylene A) however was found to have had its molecular weight reduced to approximately 10,000.

*Example II.—Gamma irradiation of polyethylene*

The polyethylene (polyethylene C) employed in this example had a molecular weight of about 90,000 and was prepared in the following manner: The catalyst was prepared by heating 30.5 g. AlEt$_2$Cl+59.5 gm. TiCl$_4$ (0.804 Al/Ti ratio) in 3900 cc. of sodium treated heptane at 50° C. for 15 minutes. After standing for 45 minutes at room temperature, the mixture was added directly to a 30-gallon Pfaudler unit containing 15 gallons of sodium treated heptane at 45° C. Matheson C.P. ethylene at the rate of 9–15 liter/min. was added under constant stirring. The reaction temperature was increased to 60° C. and thus maintained for the run duration. After 10 hours' run time, the reaction was quenched with 2 liters isopropyl alcohol at 40° C. A further 11 gallons of isopropyl alcohol was added and the resultant mixture warmed to 70° C. for 30 minutes. It was then cooled to 48° C. and stirred for an additional 12 hours. After cooling to 30° C. the crude product was removed and the bulk of the liquid removed by decantation. Upon filtration of the remainder of the liquid on a Buckner filter, the solid polymer was washed thrice with isopropyl alcohol and twice with acetone and then dried on a steam bath for 12 hours at 110° C. Yield 11.8 pounds. The polyethylene prepared as described above (polyethylene C), upon ashing yielded and ash content of about 0.7 weight percent.

A sample of polyethylene C was then irradiated in the same manner as described for the polyethylene samples in Example I. Upon completion of the irradiation, the irradiated sample was evaluated for its molecular weight and it was found that the irradiated polyethylene C had a molecular weight of about 12,000.

*Example III.—Gamma irradiation of polypropylene*

A sample of heptane-insoluble polypropylene (polypropylene A) having a molecular weight of about 130,000 was irradiated with gamma rays in this example. Polypropylene A was prepared as follows: The polymerization catalyst was prepared by mixing 22.1 ml. of 50% AlEt$_2$Cl and 50% AlEt$_3$ (0.8 molar) with 3.7 ml. of 0.8 molar TiCl$_4$ in 37 ml. of n-heptane for 15 minutes at 25° C. The resultant mixture was charged to a 3-liter stirred autoclave with an additional 633 ml. of n-heptane. 210 g. propylene were then added and the autoclave was brought to a pressure of 193 p.s.i.a. (25° C.) by pressurizing with nitrogen. Temperature was elevated to 72° C. by steam. After 18 hours at this temperature the reactor was cooled to 25° C. and drained. The polymer, in the form of a solid plug, was immersed in isopropyl alcohol. It was subsequently cut into small portions and washed for 4 hours in more isopropyl alcohol at the alcohol reflux temperature. Yield of the dried polymer was 121 g. The heptane soluble polypropylene was obtained by Soxhlet extraction. Percent of heptane insoluble polypropylene (polypropylene A)=64.6%=69.5 g. Percent of heptane soluble polypropylene (polypropylene B)=35.4%=51.5 g. Polypropylene A: Ash content=0.8 wt. percent. Polypropylene B: Ash content=0.3 wt. percent.

The heptane-insoluble polypropylene (polypropylene A) was irradiated in a manner identical to that employed in Example I. Upon completion of the gamma irradiation, it was found that the polypropylene product had a molecular weight of less than 10,000.

*Example IV.—Gamma irradiation of polypropylene*

In this example, a heptane-soluble polypropylene (polypropylene B) having a molecular weight of about 33,000 was irradiated with gamma rays. This heptane-soluble polypropylene was obtained by the method described above in Example III. The sample of polypropylene B in the present example was irradiated in a manner identical to that employed in Example I. Upon completion of the irradiation, it was found that the irradiated polypropylene B had a molecular weight of less than about 10,000.

*Example V*

In this example two different polyethylenes (each prepared by polymerizing ethylene in the presence of a catalyst obtained by mixing reducing compounds of aluminum with titanium tetrachloride) were separately irradiated employing essentially the same method described in Example I, except that the samples were placed in white glass test tubes and stoppered with corks. These two polyethylenes had the following inspections:

| Polyethylene | Molecular Weight | Wt. Percent Ash |
|---|---|---|
| D | 328,000 | 0.04 |
| E | 316,000 | 0.25 |

The following molecular weights were determined for the two samples after 15 and 65 hours of continuous gamma irradiation:

| Polyethylene | Molecular Weight | |
|---|---|---|
| | After 15 Hrs. | After 65 Hrs. |
| D | 58,000 | 28,000 |
| E | 111,000 | 42,000 |

Samples of polyethylenes D and E were also separately irradiated in sealed glass tubes from which the air had been evacuated employing the same irradiation conditions described above. After 15 hours of irradiation the samples were found to be cross-linked and insoluble in hot tetralin.

*Example VI*

In this example, samples of polyethylenes D and E (described in Example V) were subjected to non-continuous (or interrupted) irradiation according to the following schedule:

| Period | Gamma Irradiation | Hours |
|---|---|---|
| 1 | On | 16.6 |
| 2 | Off | 7.2 |
| 3 | On | 17.4 |
| 4 | Off | 4.9 |
| 5 | On | 19.0 |
| 6 | Off | 127.0 |
| 7 | On | 16.3 |

All other conditions of the irradiation were essentially the same as those employed in Example V. The following molecular weights were determined for the two samples upon completion of the irratiation:

Polyethylene: Molecular weight
D _____ 36,000
E _____ 44,000

Employing the same irradiation schedule described above, samples of polyethylenes D and E were also irradiated in sealed glass tubes under vacuum. Upon completion of the irradiation, the samples were found to be cross-linked and insoluble in hot tetralin. These examples (V and VI) show that the molecular weights of these essentially straight chain polyethylenes (prepared by polymerizing ethylene in the presence of a catalyst obtained by mixing reducing metal compounds with reducible metal compounds) can be decreased by gamma radiation when employing the irradiation conditions of the present invention. The examples also show that the presence of an oxygen-containing atmosphere, such as air, is necessary in order to obtain a reduction of the molecular weight.

What is claimed is:

1. A method for reducing the molecular weight of a polymeric material having a molecular weight of from about 30,000 to 500,000 prepared by polymerizing hydrocarbon monomers selected from the group consisting of ethylene, propylene and mixtures thereof in the presence of a polymerization catalyst prepared by mixing (1) an aluminum compound having reducing properties selected from the group consisting of aluminum hydride and organo-aluminum compounds with (2) a reducible compound of a heavy metal selected from the group consisting of metals of groups IV–B, V–B, VI–B and VIII of the periodic system, the molar ratio of said aluminum compound to said heavy metal compound in the catalyst mixture being in the range of about 0.2:1 to 8:1, which method comprises subjecting said polymeric material to gamma rays in an oxygen-containing atmosphere at a radiation dosage in the range of about 0.1 to 50 megaroentgens and at a temperature of about 0° to 250° F.

2. Method according to claim 1 wherein said oxygen-containing atmosphere is air.

3. Method according to claim 1 wherein said temperature is about 50° to 100° F.

4. Method according to claim 1 wherein said polymeric material is polyethylene.

5. Method according to claim 1 wherein said polymeric material is polypropylene.

6. A method for reducing the molecular weight of polyethylene prepared by polymerizing ethylene in the presence of a catalyst obtained by mixing aluminum diethyl chloride with titanium tetrachloride in an inert liquid diluent, which method comprises subjecting said polyethylene to in the range of 0.1 to 50 megaroentgens of high intensity ionizing radiation consisting essentially of gamma rays at about room temperature in an atmosphere of air.

7. A method for reducing the molecular weight of polypropylene prepared by polymerizing propylene in the presence of a catalyst obtained by mixing aluminum triethyl and aluminum diethyl chloride with titanium tetrachloride in an inert liquid diluent, which method comprises subjecting said polypropylene to high intensity ionizing radiation consisting essentially of gamma rays at about room temperature in an atmosphere of air and at a radiation dosage rate of at least about 0.3 megaroentgen per hour.

8. A method for reducing the molecular weight of an essentially straight chain polyethylene which comprises irradiating said polyethylene within the range of 0.1 to 50 megaroentgens of high intensity ionizing radiation consisting essentially of gamma rays in an atmosphere of air and at a temperature of about 0° to 250° F.

9. A method according to claim 1 wherein said polymeric material is a copolymer of ethylene and propylene.

10. A method of preparing a specification molecular weight polymeric product which comprises subjecting a low-pressure-process hydrocarbon polymeric material having a molecular weight greater than specification and selected from the group consisting of polyethylene, polypropylene and mixtures thereof to a total dosage of gamma radiation in the range of 0.1 to 50 megaroentgens at a temperature in the range of 0° to 250° F. in the presence of oxygen and recovering a polymeric product having said specification molecular weight, said specification molecular weight being less than the molecular weight of said hydrocarbon polymeric material.

11. A method for producing a specification molecular weight polymeric product from a polymeric material prepared by polymerizing ethylene in the presence of a polymerization catalyst prepared by mixing aluminum diethyl chloride and titanium tetrachloride in a heptane solvent at 70° C., continuing the polymerization until said polymeric material has a molecular weight of about 54,000 and recovering the polymeric material, which method comprises subjecting said polymeric material to about 29 megaroentgens of gamma radiation in the presence of oxygen at a temperature of about 0° to 250° F. and recovering a polymeric product having a molecular weight of about 10,000.

12. A method for reducing the molecular weight of a polymeric material selected from the group consisting of polyethylene and polypropylene prepared by polymerizing monomers in the presence of a catalyst obtained by mixing in an inert liquid diluent a reducing compound of aluminum with a reducible compound of a metal selected from the group consisting of the metals of groups IV–B, V–B, VI–B, and VIII of the periodic system, which method comprises subjecting said polymeric material to a total dosage of gamma radiation in the range of 0.1 to 50 megaroentgens in the presence of air at a temperature in the range of 50° to 100° F.

References Cited in the file of this patent

FOREIGN PATENTS 533,362 Belgium _____ May 16, 1955

OTHER REFERENCES

Sun Modern Plastics, volume 32, No. 1, pages 141–144, 146, 148, 150, 229–233, 236–238, September 1954.

Charlesby: "Proceedings Royal Society (London)," vol. 215A, pages 187–212, November 25, 1952.